Sheet 1 - 3 Sheets.

J. H. Manny.
Mower.

Nº 14148      Patented Jan. 22, 1856.

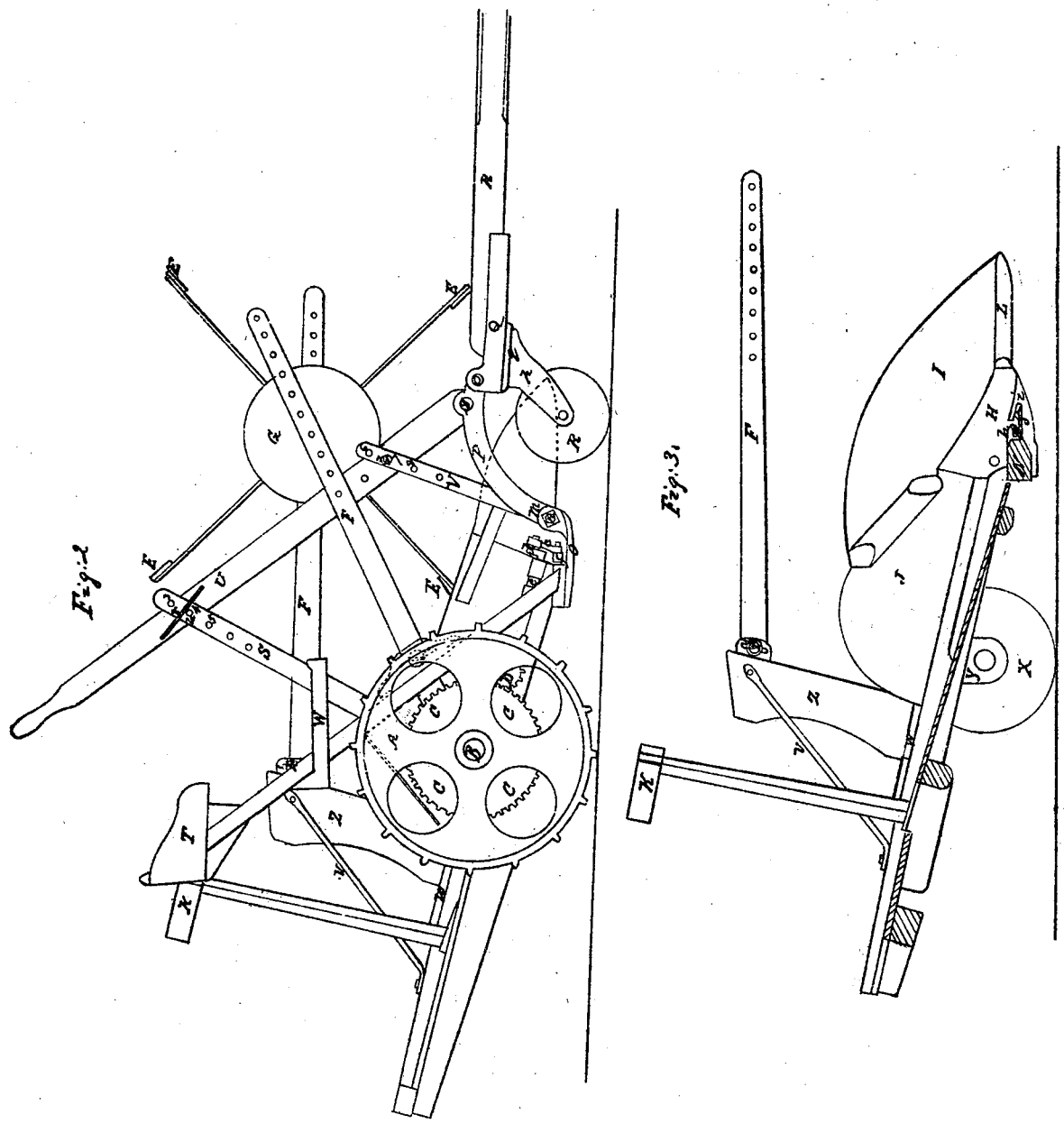

Sheet 3-3 Sh.

J. H. Manny.
Mower.

N° 14148

Patented Jan. 22, 185

UNITED STATES PATENT OFFICE.

JNO. H. MANNY, OF ROCKFORD, ILLINOIS.

IMPROVEMENT IN GRAIN AND GRASS HARVESTERS.

Specification forming part of Letters Patent No. 14,148, dated January 22, 1856.

*To all whom it may concern:*

Be it known that I, JOHN H. MANNY, of Rockford, in the county of Winnebago and State of Illinois, have invented certain new and useful Improvements in Reaping and Mowing Machines; and I do hereby declare the following to be a full, clear, and exact description of the same, reference being had to the accompanying drawings, making a part thereof, in which—

Figure 1:
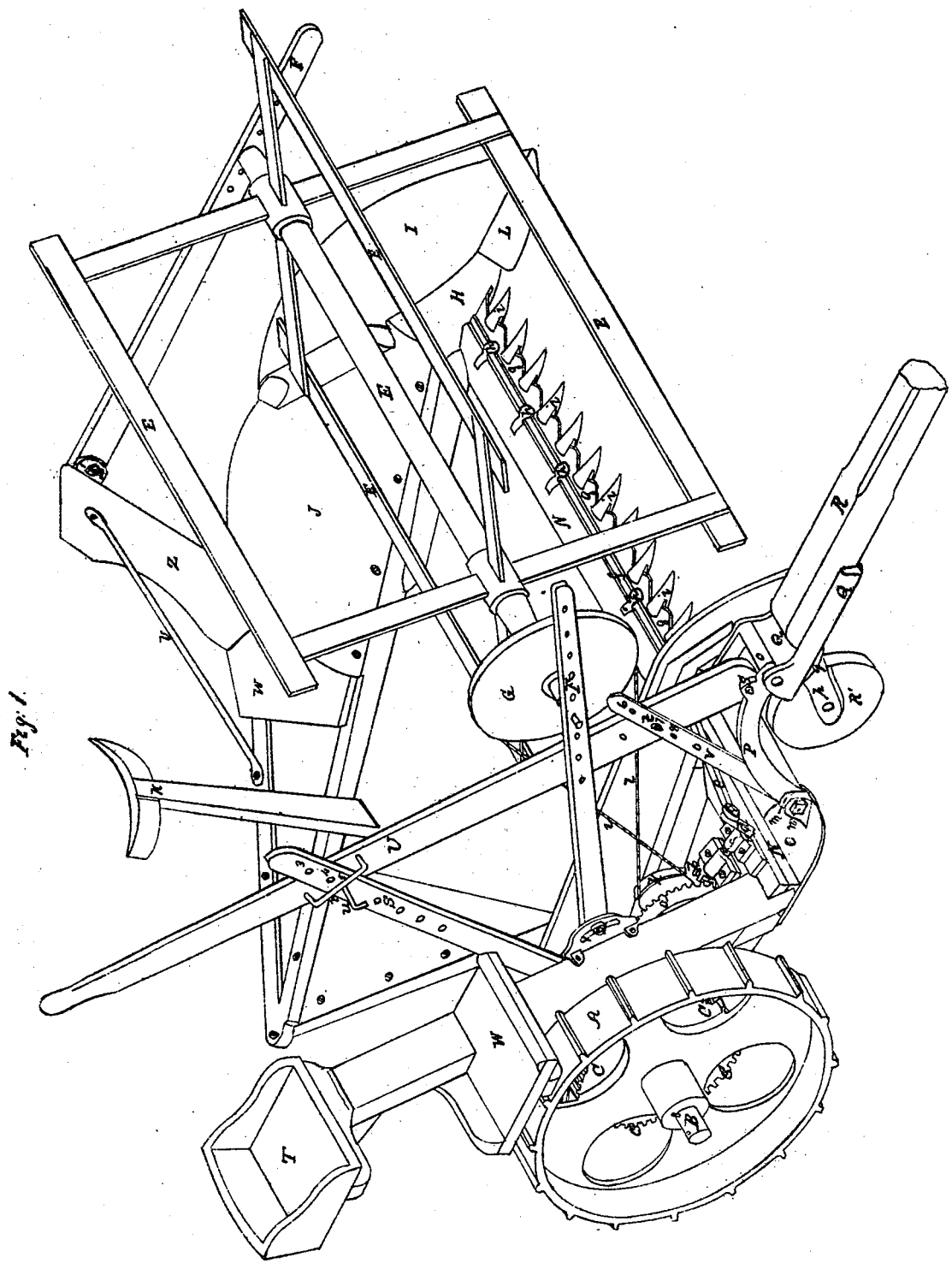
Figure 4:
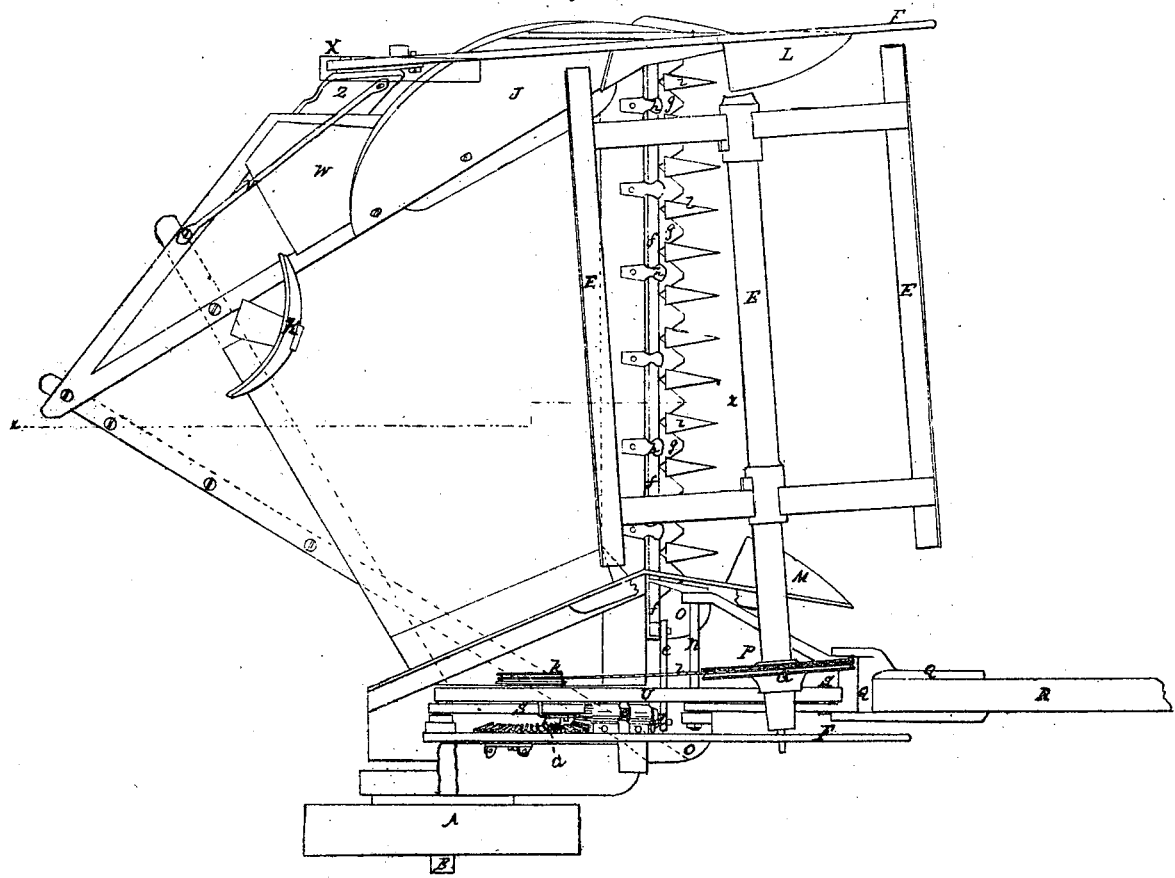

Figure 1 represents a perspective view. Fig. 2 represents a view from one side. Fig. 3 represents a section taken through the line *x x* of Fig. 4, and Fig. 4 represents a top plan with the seat removed to show the parts underneath it.

Similar letters of reference, where they occur in the several figures, denote like parts.

This machine in its general characteristics resembles those heretofore patented by me.

The nature of the improvements which particularize this invention relate more especially to the recess or space behind the divider, and between it and the fingers, for the purpose of overcoming the tendency of the grain or straw to clog or choke at the ends or sides of the platform; also, to the use of a swiveling wheel at the heel of the tongue to facilitate the turning around of the machine, and the manner of hinging the tongue to the machine; and, also, to the arrangement of levers by which the height of the cutters is regulated, and by which they are also raised up to pass over any intervening obstacle.

To enable others skilled in the art to make and use my invention, I will proceed to describe the same with reference to the drawings, confining the description more especially to those parts deemed new in their results and operation.

The platform, reel, driver's seat, forker's stand, and the cutting apparatus may be of the form and construction shown in the drawings, or of any other known form or construction, as my improvements are not restricted in their use to any special form of machine, but may be used in connection with any of the ordinary reaping and mowing machines.

A is the main driving and supporting wheel, arranged on an axle or journal, B, provided with suitable holes, both outside and on the inside of the hub of said wheel A, for the purpose of slipping said wheel out and holding it out of gear with the other parts of the machine which it operates when the machine is drawn to or from the field. The periphery of the wheel or its tread may be provided with ribs or projections to prevent its slipping on the ground. On the rear of the wheel A is cast or otherwise permanently attached a cogged wheel, C, which takes into and gives motion to a pinion, D, Fig. 2, which is arranged on one end of a shaft which carries a bevel cog-wheel, *a*, at or near its center. The bevel cog-wheel *a* meshes with a bevel-pinion, *b*, on the shaft *c*, and gives motion to said shaft. The shafts of these wheels and pinions are all supported in properly-arranged boxes or bearings firmly connected to the main frame of the machine. On the end of the shaft *c* is a crank, *d*, to which is connected, through the pitman *e*, the bar *f*, to which the cutters *g* are attached, said bar *f* reciprocating through the guides *h*, while the cutters *g* at the same time play through the fingers *i*.

The reel E is hung in the reel-posts F, said reel-posts being made adjustable at or near their rear portions by means of a segmental slot, 1, and set-screw 2, passing through said slot and into the reel-posts, respectively. By this means the reel may be raised or lowered to strike the grain higher up or lower down, as may be found desirable. The forward ends of the reel posts or supporters are provided with a series of holes for the journals of the reel, so that the reel may be set forward or back, to gather in more or less grain for the cutters, at pleasure. When the machine is arranged for mowing grass the reel may be removed. The reel is driven from a pulley, *k*, on the end of the shaft which carries the bevel-wheel *a* by means of an endless belt, *l*, passing around said pulley and around a larger pulley, G, on the axle or shaft of the reel, said axle or shaft standing slightly oblique to the line of motion of the machine, as seen in Fig. 4, so that its blades will bring the straw or grain to the cutters with a curved sweep, and not directly against them.

On the outer end of the machine, or that end next the standing grain, is a metallic shoe, H, through which the extreme cutting-blade of the series passes or vibrates, said shoe being firmly united to and with the several parts of the machine extending to or located there, to give the whole the proper degree of strength required at that important point of the machine, which enters the standing grain and divides that which is to be cut from that which is to be left standing.

I is a vertically-placed dividing-board projecting beyond or forward of the point of the shoe H, and secured to said shoe, its rear portion being united to the inclined guiding board or piece J, whose bottom or base is parallel with the outer side of the platform, the two boards I J serving to first divide and then properly direct the cut grain onto the platform, whence it is removed by the forker, whose stand is at K, near the outer rear corner of the platform.

To the inner side of the dividing-board I, on line or flush with its lower edge, is attached a horizontal (or nearly so) wedge-shaped piece, L, which forms a point with the front of said piece I, but which terminates in a square, oblique, or other shaped shoulder at its rear, so as to form a recess or space behind it and between it and the shoe or extreme outer cutting portion of the blade, into which recess or space a portion of the straw or grain first forced away by the wedge-shaped piece L toward the center of the cutters may afterward fall and be cut, the object being to take away from the extreme outer cutting part of the machine a portion of the grain which it has heretofore been required to cut, and which was greater than its due proportion or facility for severing, owing to its packed condition by being forced within the line of the cutting-blades. The main portion of the cutting blade or blades meets and severs the grain as it ordinarily stands on the ground; but the extreme outer portion must act on this quantity, and, in addition to it, the amount which is forced inward from the outside of the machine. This throwing of an excess of work upon that part of the machine which has always been difficult to regulate caused it to clog and choke, and after repeated experiment I have avoided that hitherto difficult point, not by carrying all the straw away from that point, as this would be only removing the difficulty from one point of the machine to another point and not overcoming it, but I give the grain a motion tending inward, which a large portion of it maintains until severed by the cutters, while another portion, after it arrives at the shoulder, recess, or space, drops back into it and is severed by the cutting part immediately behind the recess. Thus that part of the cutter which was so overloaded with work is relieved of all except its due proportion, and all clogging or choking at that point is avoided. A similar horizontal wedge-shaped piece, M, with that just above described as placed on the outside of the machine may be placed at that end of the cutters next the driving-power to throw a portion of the straw from the cutting point there, and, by thus relieving the cutter next the partition on that side of the machine, prevent choking or clogging there.

That part of the frame N which supports the cutter-bar, guides, and fingers projects in rear of the line of draft, and has connected to it two metallic pieces, O, (one only being distinctly seen,) upon the upper sides of which are lugs m, through which and through corresponding lugs or holes in the curved metallic piece P passes a bolt or rod, n, Fig. 4, for hinging said piece P to the frame low down and nearly in line with the cutters. The piece P curves upward and forward, as seen in Figs. 1, 2, and at its forward part, o, is pivoted or hinged the shoe or stock Q, to which the tongue R is connected permanently. The tongue is therefore hinged by double joints to the frame, for a purpose that will be now described. On the under side of the stock or shoe Q, and about under the rear of the tongue, is placed so as to freely turn thereon a swiveling wheel, R', which serves both as a support to the parts connected with it and by following the line of the tongue in its least deviation causes the machine to follow the horses in turning around without the least straining of the machine or exertion by the horses and without requiring any considerable space of ground to turn on. The wheel R' is supported in arms p, which are connected with a plate, q, that turns in a countersink or within raised flanges on the under side of the stock or shoe Q. Any other way of connecting the wheel so that it will swivel and follow the line of draft of the horses will serve the purpose. The interposition of the curved piece P between the hinges admits of the adjustment of the cutters without materially changing the position of the tongue, and admits of the placing of the swiveling wheel under the tongue without affecting in any essential manner the adjustment in the line of the cutters. Both the cutters and the tongue have their hinges independent of each other. Although they have in some degree a joint action, yet one may move independent of the other to accomplish its single end without affecting the other. With a single hinge the result could not be attained.

An upright piece, S, is hinged to the frame near the axle of the driving-wheel, and which projects upward within reach of the driver in his seat T. This brace or supporting piece S is provided with a series of adjusting-holes, 3 4 5, &c., and passes through a staple, r, on the side of a lever, U, which is hinged or pivoted to the curved piece P at s, immediately in rear of where the tongue or its stock or shoe Q is hinged to said curved piece, and the other end of said lever U is within convenient reach of the driver, who is the director of the machine.

V is a strap, connected and made adjustable with the lever U by means of the screw or pin t and holes 6 7 8 at one of its ends, the other end being attached to the rod that forms the lower hinge, and by which the curved piece P is hinged to the pieces O, as heretofore described.

u is a pin passing through the hinged piece S and lever U for holding the two at any desired point. The driver in his seat T, with his feet resting upon the foot-board W, can by taking hold of the lever U raise or lower the cutters at pleasure, the fulcra of said lever being at $s$, almost directly over the center of the swiveling wheel R'. The strap V, as before stated, has its lower end connected to the rod $n$, and this rod is in line with the points of the cutters, or nearly so. Consequently the hinge upon which the cutters work up and down is in line practically with the cutters, and may freely turn on that line, the piece P turning on its forward hinge at $o$ to admit of it.

X, Figs. 3 and 4, is the outside supporting-wheel, supported in a bearer, Y, which is made adjustable on the outside of the frame, so as to raise or lower that side of the machine. The wheel X stands within the extreme outer line of the machine, and is protected from the cut grain or grass by the inclined board J, under which it is arranged. The position of the wheel is seen in Fig. 4, partially in red lines.

The frame underneath the platform is of a trapezoidal form, or of double trapezoids, which gives it great strength and lightness, and the grain is delivered from the platform in a rearward oblique direction from that of the standing grain.

Z is a stud or standard on the outside rear corner of the machine, suitably braced by an iron brace, $v$, to the oblique part of the frame, and in this stud or standard is supported the outside reel post or arm, F.

$w$ is a cover fitting over a tool-box below it, in which may be kept such tools or parts of the machine as may be required to repair it in the field.

Having thus fully described the nature of my invention, what I claim therein as new, and desire to secure by Letters Patent, is—

1. In connection with a dividing-piece for throwing the grain inward from the extreme ends of the cutters or platform, a recess or space behind said piece, into which a portion of the grain may afterward drop and be cut, for the purpose of obviating the tendency to choke or clog at the ends of the cutters, substantially as described.

2. The intermediate piece, P, between the tongue and the cutter-beam, for the purpose of providing a yielding or elastic joint, not only at or about the line of the cutters, but also at the heel of the tongue, substantially as described.

3. Supporting the heel of the tongue, or the shoe or stock to which the tongue is attached, on a swiveling wheel, for the purpose of facilitating the turning around of the machine or to cause it to follow every deviation of the tongue without in the least straining it, substantially as described.

4. In combination with the lever U, having its fulcra pivoted intermediately between the tongue and the frame of the machine, the strap V and hinged supporting-piece S, for the purpose of regulating the height of the cutters, substantially as described.

In testimony whereof I have hereunto subscribed my name.

JOHN H. MANNY.

Witnesses:
P. H. WATSON,
F. G. DE FONTAINE.